Aug. 7, 1923. 1,464,015
W. P. SCHMID
GAS VALVE
Filed Dec. 31, 1920 2 Sheets-Sheet 1
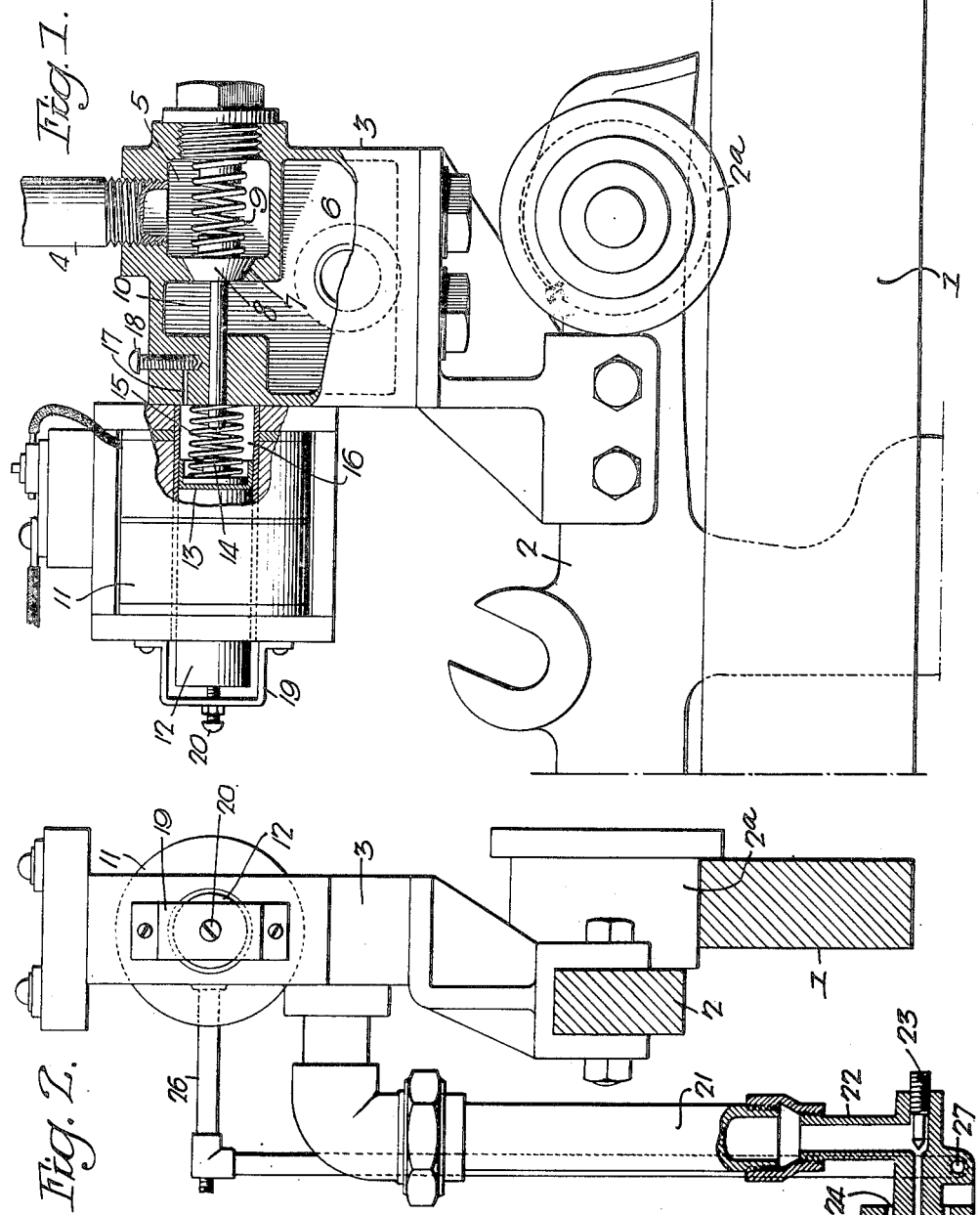
Inventor-
William P. Schmid.
by his Attorneys-
Howson & Howson Aug. 7, 1923.

W. P. SCHMID

GAS VALVE

Filed Dec. 31, 1920

Inventor—
William P. Schmid.
by his Attorneys

Patented Aug. 7, 1923.

1,464,015

UNITED STATES PATENT OFFICE.

WILLIAM P. SCHMID, OF PHILADELPHIA, PENNSYLVANIA, ASSIGNOR TO ATLAS ENGINEERING COMPANY, OF PHILADELPHIA, PENNSYLVANIA, A CORPORATION OF PENNSYLVANIA.

GAS VALVE.

Application filed December 31, 1920. Serial No. 434,383.

*To all whom it may concern:*

Be it known that I, WILLIAM P. SCHMID, a citizen of the United States, residing in Philadelphia, Pennsylvania, have invented certain Improvements in Gas Valves, of which the following is a specification.

My invention relates to certain improvements in means for controlling the flow of gas to burners used in connection with printing presses for the purpose of overcoming, or dissipating, the static currents of electricity which are set up during the printing operation.

One object of the invention is to provide a suitable valve for controlling the flow of gas to the burners, and also to provide a solenoid magnet and a dash pot so that the valve will operate accurately.

A further object of the invention is to construct the valve and the mechanism connected therewith so that the gas will be shut off immediately, the moment the press is stopped, and, as soon as the press is in motion, will be automatically opened.

In the accompanying drawings:

Fig. 1 is a side view, partly in section, of my improved valve mechanism for controlling the flow of gas to burners employed in connection with printing presses;

Fig. 2 is an end view;

Figure 3:
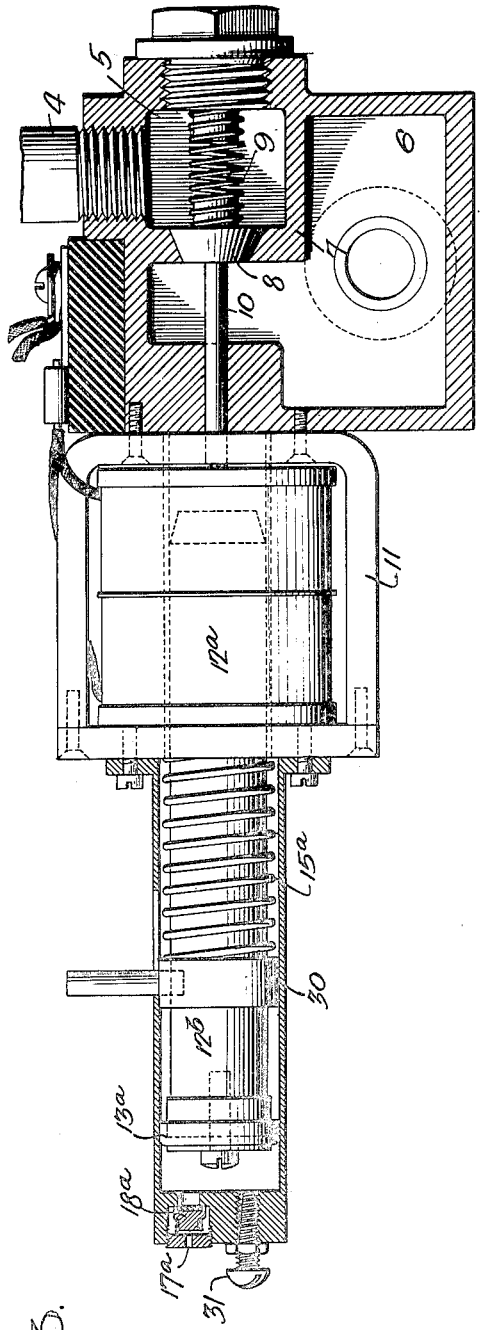
Fig. 3 is a view illustrating a modification of the invention.

1 represents one of the rails of the printing press, upon which is mounted a carriage 2, having wheels 2ª adapted to said rails. In the present instance, this carriage supports a casing 3 in which are two gas chambers 5 and 6. 4 is a supply pipe for gas, which communicates with a chamber 5. In the wall of this chamber 5 is a valve seat 7 closed by a valve 8 and yieldingly held in the closed position by a spring 9. 10 is a stem projecting from the valve through an opening in the casing of the chamber 6, and secured to the back of the casing 3 is a solenoid magnet 11, in which is a core 12 of the usual construction.

13 is a cup packing, which is secured to the forward end of the core 12 and a stem 14 on this core extends a given distance towards the stem 10 of the valve. 15 is a spring located between the casing and the core, and the space between the end of the core and the casing forms a dash pot 16. The passage of air into and out of this dash pot is through a passage 17 controlled by a screw valve 18 so that, on turning this valve, the speed at which the core travels can be regulated.

On the rear of the frame of the solenoid magnet 11 is a bracket 19 having an adjusting screw 20 located in the path of the core 12. On adjusting this screw, the movement of the core can be regulated. A switch, of any suitable construction, which is controlled by the press, can be so regulated that the moment the press stops the valve 8 will close cutting off the supply of gas to the burners. As soon as the press starts up, the valve 8 is opened and the proper amount of gas is supplied to the burners.

32 is a burner tube having perforations through which the gas escapes. This tube extends from one side of the press to the other side and is connected at one end to the chamber 6 of the casing 3 through a pipe 21. The nozzle section 22 of the burner has a screw valve 23, which regulates the supply of gas to the burner. The nozzle extends into the burner tube, as shown in Fig. 2, and air is admitted to the tube through openings 24.

Figure 4:
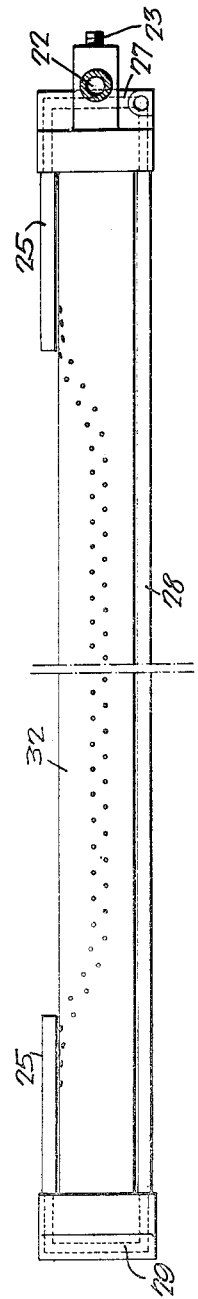
Fig. 4 is a plan view of the burner.

Pilot burners 25 are located, in the present instance, at each end of the tube 32, Fig. 4, and the gas supply pipe 26 is connected to the gas chamber 5 and with a passage 27 in the nozzle section 22. This passage is directly connected to one of the pilot burners 25 and is indirectly connected to the other pilot burner through a pipe 28 and tubular head 29. The arrangement of the burner tube and pilot burners may be modified without departing from the main feature of the invention.

In Fig. 3, a modification of the invention is illustrated, in which the dash pot is located at the rear of the solenoid magnet and the core 12ª is extended to form a plunger 12ᵇ. On this plunger is a collar 30, and between this collar and the end of the solenoid magnet is a spring 15ª. 13ª is a cup packing, and 17ª is an air passage in the end of the dash pot. 18ª is a spring-pressed valve controlling the exhaust of air. 31 is a screw valve for regulating the supply of air to the dash pot.

I claim:

1. In means for controlling the flow of gas to burners of printing presses, the combination of a valve casing having a chamber therein; a pipe communicating with the chamber; a burner connected to the casing; a valve controlling the flow of gas from the chamber, said valve having a stem; a spring tending to close the valve; a solenoid magnet having a dash pot and core, said core being spaced from the stem of the valve; a spring tending to move the core from the valve; an air passage communicating with the dash pot; and a valve controlling the flow of air through said passage.

2. The combination of a valve casing having a chamber therein: a pipe forming communication with the chamber; a burner connected to the casing; a valve controlling the flow of gas from the chamber, said valve having a stem; a spring tending to close the valve; a solenoid magnet having a core spaced from the stem of the valve; a spring between the casing and the core, the space in front of the core forming the dash pot; an air passage communicating with said space; and a valve controlling the flow of air through said passage.

WILLIAM P. SCHMID.